Jan. 9, 1923.
K. P. McELROY.
FIXATION OF NITROGEN.
FILED MAY 17, 1920.
1,441,693.
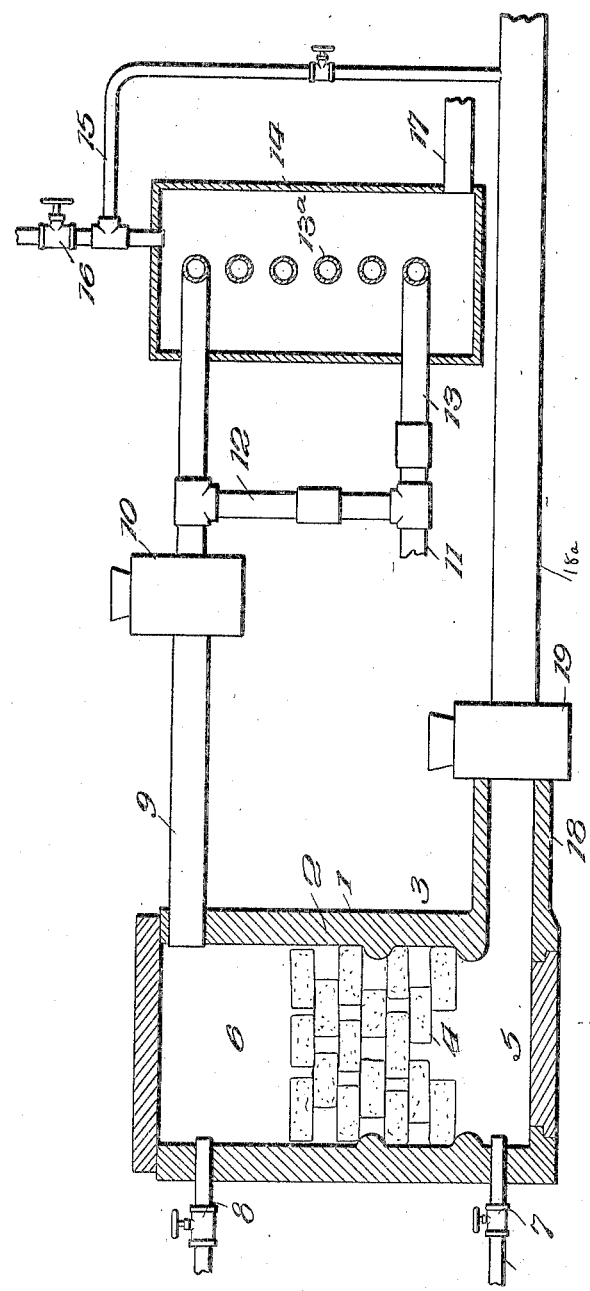
Inventor
K. P. McElroy.

Patented Jan. 9, 1923.

1,441,693

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

FIXATION OF NITROGEN.

Application filed May 17, 1920. Serial No. 382,156.

*To all whom it may concern:*

Be it known that I, KARL POMEROY MCELROY, a citizen of the United States, residing at Washington, in the District of Columbia, have invented certain new and useful Improvements in Fixation of Nitrogen, of which the following is a specification.

This invention relates to fixation of nitrogen; and it comprises a method of producing ammonia wherein a pervious charge comprising an alkali (potash, soda or baryta) and a catalytic metal (iron, cobalt or nickel) is alternately treated with hot gases containing nitrogen and carbon monoxid and with steam; all as more fully hereinafter set forth and as claimed.

Of the very many ways of fixing nitrogen which have been proposed from time to time but few have gone into actual commercial practice. One of these few successful methods was that of Mond wherein barium carbonate was mixed with finely powdered coke and formed into briquets which were then exposed to the action of nitrogen or producer gas at a high temperature, forming barium cyanid. The carbon of the coke disappeared as carbon monoxid. The barium cyanid was afterwards steamed to produce ammonia and reproduce barium carbonate or other oxidized compound. The sensible heat of the gases was, for the most part, relied upon to give the temperatures necessary; and to secure an economy of heat a plurality of chambers were used, the hot gases being sent through these methodically in a well understood way. In the operation of the process however certain practical difficulties arose which eventually led to its discontinuance, among these being the great amount of labor required in making and handling briquets and the rapid contamination of the baryta by coke ash.

It is an object of the present invention to improve on this method by obviating the stated disadvantages while securing certain new advantages. To this end in lieu of employing perishable briquets requiring handling and renewing, suitable permanent reaction members or contact members containing baryta (or another alkali) and a catalytic metal (cobalt, nickel or iron) are used. The carbon necessary for reduction and for forming cyanid is produced in the contact members by the action of the catalytic metal on carbon monoxid. This carbon is ashless, finely divided and highly reactive while its production is attended by a development of heat which much accelerates heating up the charge after the steaming or ammonia producing operation.

In the gasification of carbon in a gas producer to form carbon monoxid although much heat is evolved a still greater quantity disappears or is rendered latent and the carbon monoxid produced has a strong tendency, throughout a range of temperatures extending up to perhaps 800 or 900 C., to break up into carbon dioxid and solid carbon with development of heat. This action is catalyzed by many metals. Iron, cobalt and nickel all catalyze it energetically and, as it happens, these metals also catalyze the formation of cyanids from alkalies, carbon and nitrogen. The catalytic metal in the reaction members of the present invention therefore has several functions; it produces ashless carbon, aids in heating up after steaming and aids in forming cyanid.

The reaction members may be assembled from metal and alkali in any convenient way giving shapes adapted for thorough gas contact while not opposing undue frictional resistance to the passage of gas currents. It is generally best to incorporate more or less magnesia with the alkali, and particularly when potash or soda is used, to help in keeping the mass open. In one way of manufacture boxes of "expanded metal" or wire netting may be filled with granular "double-burnt" magnesia or dolomite such as is on the market for lining basic furnaces; this granular material having first been impregnated with a salt of iron, cobalt or nickel and with a salt of potassium, sodium or barium. A little lithia may advantageously be used in connection with the alkali. These boxes may then be stacked in a suitable chamber like the bricks in an ordinary checkerwork regenerator. Instead of using previous metal blocks, magnesia bricks may be impregnated with metal and alkali and assembled as a checkerwork. An excellent reaction member is given by bonding granular commercial magnesia or dolomite refractories into open-textured bricks with the aid of a little slag and a high heat, and thereafter so impregnating. But I find boxes of wire netting or "expanded metal" containing an open textured contact mass are best since they resist volume changes in the reaction due to deposition and disappearance of carbon, production of cyanid, etc., better than bricks. Iron or the heat-resisting steels and alloys (such as nichrome) may be used as the material of the boxes. In lieu of either bricks or boxes, I may use ordinary strong metallurgical coke, impregnated with catalytic metal and alkali. As carbon deposited by catalysis is much more reactive than coke carbon, coke fragments used as a carrier will last for a long time. After a time, bricks are apt to crumble, and it is an object of the present invention to produce a permanent reaction member.

The reaction chamber can be built in any suitable way and of any suitable material. A steel chamber lined with magnesia or dolomite bricks does very well. It should be provided with steam and gas inlets and ammonia and gas outlets; and it should also be provided with a filter member in the gas inlet line containing charcoal or coke to keep dust out of the reaction chamber. If potash or soda is used as the alkali it is desirable also to provide the gas outlet with a charcoal filter to hold back cyanid fumes.

As the source of gas any gas producer may be employed. The hotter the gas is the better, and for this reason, and others, I recommend a slagging gas producer with gas taken off from the hot zone. Blast furnace gas, especially gas from the hot or bosh zones, is also suitable. If ordinary producer gas is employed it is usually desirable to step up its temperature somewhat by the aid of stoves or regenerators since the final or cyaniding reaction takes place quicker at temperatures above 1000° C. than at lower heats. However, temperatures between 800° and 1000° also give cyanid.

In the accompanying illustration I have shown, more or less diagrammatically, in central vertical section, certain apparatus within the described invention and susceptible of use in performing the described process.

In this showing, element 1 is a reaction chamber lined with basic brickwork 2. As shown, the lining is provided near the bottom with inward extensions 3 on which rests a charge of reaction members 4, leaving a clear space 5 below and a clear space 6 above. Through the wall pass a steam pipe 7 and an ammonia exit 8, both being suitably valved. Near the top enters conduit 9, provided with gas filter 10, for hot gases. As shown, gas from a suitable producer or blast furnace (not shown) enters through 11 and may pass directly by 12 to said conduit or it may pass by 13 to a stove or preheater 14. As shown, this stove contains tile or other piping 13ª through which gas may pass. At the top, the stove is provided with firing means consisting, as shown, of gas inlet 15 and air inlet 16 and at the bottom it has waste gas outlet 17 leading to a chimney stack or other place of disposition. Leading from the bottom of the reaction chamber is a gas outlet conduit 18 provided with charcoal filter 19.

In the use of the structure shown, presuming the charge to be cold and to consist of barium carbonate and iron (oxid) on a suitable carrier, hot producer gas is admitted through 9 and passes downward. As the charge heats up, the iron becomes reduced and catalyzes the decomposition of carbon monoxid, producing a deposit of hot reactive carbon, the temperature of the mass going up rapidly. After a time a cyaniding temperature is reached and the deposited carbon and the barium carbonate react together with nitrogen to form barium cyanid and carbon monoxid. In the first or heating up stage when carbon is deposited, the outgoing gas passing away through 18 contains much carbon dioxid, but in the second or cyaniding stage the gas coming off through 18 is enriched in carbon monoxid. The two grades of outgoing gas may be separately collected and used for such purposes as may be desired, or they may be mixed and averaged as to composition and calorific value. In the cyaniding stage the quantity of heat consumed is considerable and this is furnished as sensible heat of gas coming in through 9.

After the charge is cyanided, the flow of gas is interrupted. The charge may or may not then be allowed to stand for a time to cool. Steam (or atomized water) is blown in through 7. Water vapor passes through the charge, forming ammonia which passes together with the excess of steam through 8 to suitable collecting means (not shown). When the cyanid is reconverted into carbonate, the steam is cut off and gas once more introduced, and so on indefinitely.

Where the gas used is not hot enough for the present purposes, it may be heated in the stove. To this end gas entering at 11 instead of passing directly into the reaction chamber through 12 is sent through 13 and the piping 13ª and heated by the combustion of gas from 15 and air from 16. As the temperature of the charge reaches about 800° cyanidation begins and becomes very active at about 1000° C. In cyanidation the barium carbonate is reduced by the previously deposited carbon, giving barium cyanid and carbon monoxid. The latter joins and enriches the gas.

While for the sake of simplicity of illustration I have shown but one reaction chamber it will be understood from 3 to 6 operating together but out of phase can be employed. In such a mode of operation, the gas introduced into a steamed chamber through inlet 11 may have passed through a plurality of previous chambers being cooled and enriched in carbon monoxid as it passes. After a time a new steamed charge is placed in circuit to receive the emerging gas and so on till the first steamed charge is hot enough to be cyanided when it is treated with fresh very hot gas. If, for example, hot bosh gas of 1300° or 1400° C. from a blast furnace (which generally carries cyanid in fumes) is available and presuming the reaction chamber shown to contain a charge at, say 800°, the gas is sent through 11, 12, 10 and 9 to the reaction chamber. In filter 10 it drops all its cyanid as well as any flying dust which it may contain. Passing out at 18, somewhat enriched in carbon monoxid and somewhat cooled, say to 900°, it will be sent to the inlet 11 of a similar apparatus at a somewhat less advanced stage. In this second apparatus it is deprived of much of its sensible heat, heating the charge to, say, 800°. It does not here drop much carbon, the temperature being too high. Passing to the next apparatus however at a lower temperature it here deposits carbon and heats up the charge. This next apparatus may be one which has just been steamed.

In using ordinary producer gas the same routine may be employed, the stove 14 being only employed for the last or cyaniding stage.

After a charge is cyanided however, it cannot well be employed for heating up gases containing CO for the reason that at temperatures ranging below 800° there is a tendency for the reaction to reverse, carbon monoxid reconverting the cyanid into carbonate.

What I claim is:—

1. In the fixation of nitrogen, the process which comprises alternately exposing a contact mass containing alkali and a catalytic metal to the action of hot gas containing nitrogen and carbon monoxid and to the action of steam, said gas at first depositing carbon at the expense of the carbon monoxide and then forming cyanid at the expense of the nitrogen.

2. In the fixation of nitrogen, the process which comprises exposing a contact mass containing alkali and a catalytic metal to the action of producer gas, the exposure being first at a relatively low temperature to deposit carbon in said mass and then at a higher temperature to convert the alkali into cyanid, dropping the temperature and steaming the mass to cool it and form ammonia with reformation of alkali, and repeating the treatments.

3. In the fixation of nitrogen, the method which comprises providing a suitable reaction chamber with a pervious charge containing alkali and a catalytic metal and in succession depositing carbon in said charge by treatment with carbon monoxid at a relatively low temperature, converting the alkali and carbon into cyanid by nitrogen at a higher temperature and producing ammonia with reformation of alkali by steam, said succession being continued a plurality of times.

4. In the fixation of nitrogen, the process which comprises the combination of the three successive steps of (1) heating a contact mass containing alkali and a catalytic metal by contacting therewith gas containing carbon monoxid, at a temperature below 800° C. whereby carbon is deposited in said contact mass from said carbon monoxid by exothermic reaction, (2) continuing the heating of said contact mass and deposited carbon by contacting therewith nitrogen-carrying gas of a temperature above 800° C. whereby cyanid is formed in said contact mass, and (3) cooling and steaming said contact mass containing cyanid whereby ammonia is formed and alkali regenerated.

In testimony whereof, I affix my signature.

K. P. McELROY.